Dec. 27, 1949     B. SHELDON, JR     2,492,327
BEER POURING DEVICE
Filed May 8, 1945

INVENTOR.
BUTLER SHELDON, Jr.
BY
*Irving Seidman*
ATTORNEY

Patented Dec. 27, 1949

2,492,327

UNITED STATES PATENT OFFICE 2,492,327

BEER POURING DEVICE

Butler Sheldon, Jr., New York, N. Y., assignor to Triumph Laboratories Inc., a corporation of New York Application May 8, 1945, Serial No. 592,702

3 Claims. (Cl. 222—189)

This invention relates to improvements in a beer pouring device.

Broadly, it is an object of my invention to provide a beer pouring device which may be applied to the neck of the standard bottles when the beer is sold.

More specifically, it is an object of my invention to provide a device which has a series of screens at the pouring end thereof, so that when the device is applied to the neck of the bottle and the beer poured through it, a finer head is obtained on the beer which is more like a head obtained from draft beer.

A further object of my invention is to provide an inexpensive device which can be applied to standard bottle necks, which enhances the taste of the beer after it is poured through said device.

A further object of my invention is to provide a device which reduces the size of the gas bubbles after the beer is poured through it in order to give a more creamy quality to the beer.

For a fuller understanding of the nature and objects of my invention, reference is had to the following detailed description in connection with the accompanying drawings, in which.

Figure 1:
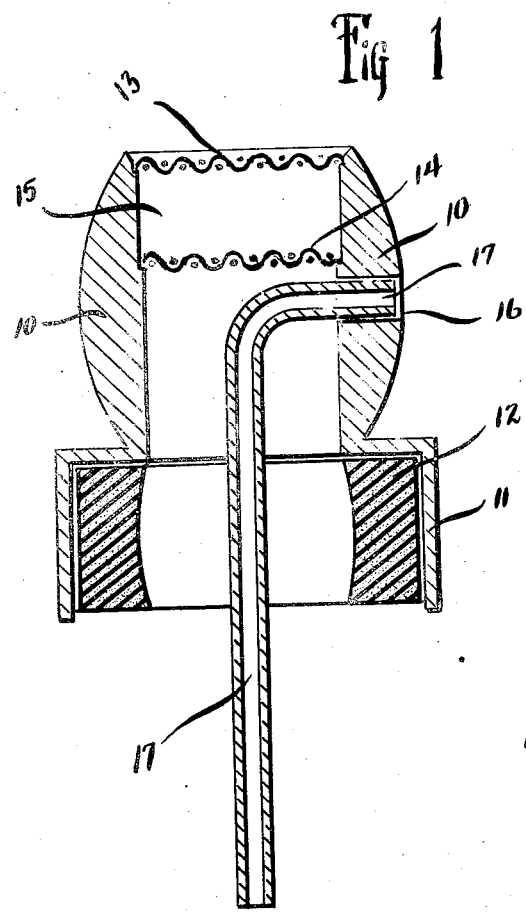
Fig. 1 is a vertical section taken through the device.
Figure 2:
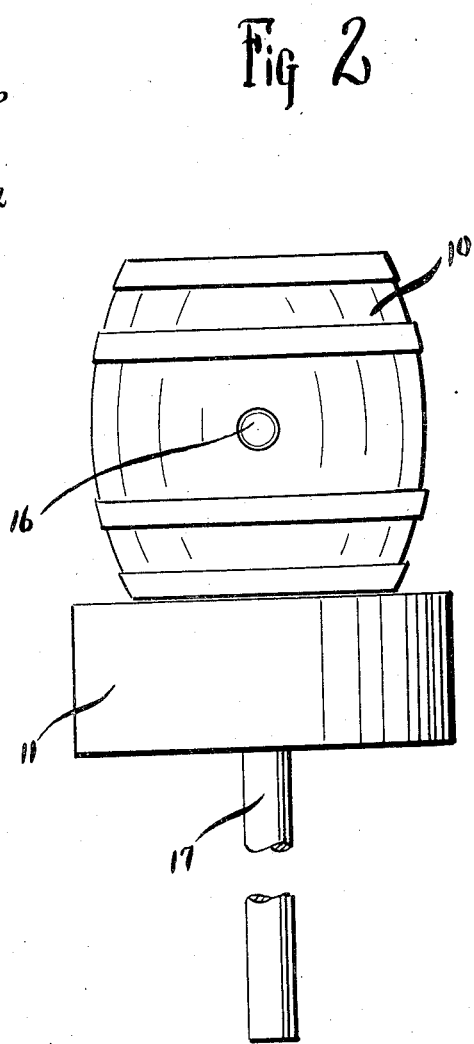
Fig. 2 is a side elevation of my device with the tube insert partly broken away.
Figure 3:
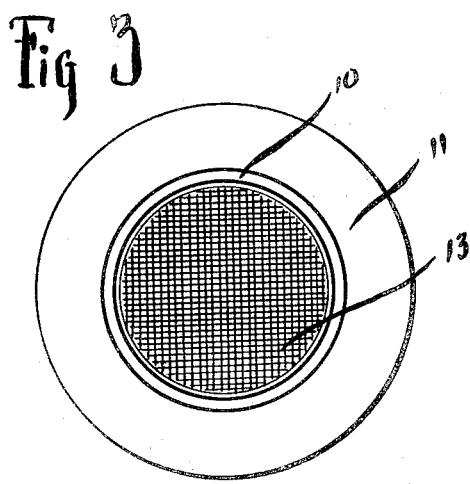
Fig. 3 is a top view of the device shown in Figs. 1 and 2.

Referring to the drawings, numeral 10 represents the walls of a chamber preferably giving the appearance of a small beer barrel. The lower portion has a circular collar 11 which has a gasket of soft material 12, adapted to fit upon the neck of the standard beer bottle, gasket 12 being preferably of sponge rubber, but it may be of other resilient materials such as cork, leather, flexible plastic or the like. The upper portion of the chamber contains an upper screen 13 and a lower screen 14, such screens may be made of fine wire mesh, preferably of non-rust material such as copper brass which may be plated, or of perforated materials of non-rust metals or plastic. Between screens 13 and 14 there is a chamber 15. In the central wall 10 of the device, there is an opening 16 through which the ends of small pipe 17 is inserted. Pipe 17 is bent at a right angle with a long extension which enters the neck of the bottle upon the application of the device to the bottle. This tube permits air to enter the bottle so that the proper pressure is provided to permit the beer to flow through the device when the bottle is inverted for pouring.

When the crown seal is removed from the standard beer bottle, my device is forced over the collar of the bottle neck because of the resiliency of the material 12 which provides an airtight seal. Tube 17 has thus been inserted through the neck of the bottle. The beer bottle with my device housed thereon is then poured so that the beer passes through screen 14 and enters the agitation chamber 15, and passes immediately through the outer screen 13. The passage of the beer through the screen and agitation chamber, breaks up the gaseous particles so that the beer enters the container with a creamier quality and a larger and finer "head." I have found that the standard bottled beers poured through my device are given a finer taste, that is, the taste is more like a draft beer. I have found that the beer poured through my device provides a fine series of bubbles which gives the poured beer a longer lasting head.

By removing the pipe 17 from my device and inverting it and applying it to the spout of a beer drawing tap, my device will also improve the quality of draft beer, since draft beer poured through a similar device will aid in order to provide an aerated beer.

It is understood that I do not desire to be limited in the shape of my device, nor in the number of screens I have provided, since one or a multiplicity of screens may be used in place of the double screen which I have provided, nor do I desire to be limited to any specific type of material from which my device may be made, so that the spirit of the invention is not limited.

I claim:

1. A device of the character described, comprising a chamber having a gasket at one end, a collar around said gasket and a pair of parallel screens at the opposite end, a pipe within said device leading to the outside atmosphere to permit air to enter a bottle when the device is applied to the neck thereof to equalize the pressure within the bottle and the outside atmosphere, whereby bottled beer may be poured through the device to increase the quality and flavor thereof.

2. In combination, a device to fit the neck of a standard beer bottle, said device having a chamber, gasket, a collar around said gasket below said chamber to fit the standard beer bottle neck, a pair of parallel fine screens at the upper end of said device providing an agitation chamber therebetween, and an air inlet pipe within said device leading to the outside atmosphere to equalize the pressure within the bottle and the outside atmosphere whereby when beer is poured from the bottle through said device, the quality and flavor of said beer will be improved.

3. In a beer pouring device of the character described comprising a housing having a gasket at the lower end thereof to fit the standard beer bottle neck, an inner screen and an outer screen parallel thereto attached to the walls of said housing providing an agitating chamber between said screens, an inner tube within said housing, one end thereof leading to the outside atmosphere and the opposite end leading into the beer bottle to equalize the pressure within the bottle and the outside atmosphere whereby when beer is poured through said device a creamier and more lasting head to the beer is provided.

BUTLER SHELDON, Jr.

REFERENCES CITED

The following references are of record in the file of this patent:

UNITED STATES PATENTS

| Number | Name | Date |
|---|---|---|
| 1,178,903 | Campo | Apr. 11, 1916 |
| 2,091,042 | Hedges | Aug. 24, 1937 |
| 2,203,130 | Costello | June 4, 1940 |

FOREIGN PATENTS

| Number | Country | Date |
|---|---|---|
| 8,766 | Australia | Aug. 16, 1933 |
| 616,043 | France | Oct. 25, 1926 |